UNITED STATES PATENT OFFICE.

PAUL I. MURRILL, OF NEW YORK, N. Y., ASSIGNOR TO GOODYEAR'S METALLIC RUBBER SHOE COMPANY, A CORPORATION OF CONNECTICUT.

PROCESS OF VULCANIZING RUBBER.

1,159,327.  Specification of Letters Patent.  Patented Nov. 2, 1915.

No Drawing.   Application filed December 10, 1914.   Serial No. 876,489.

*To all whom it may concern:*

Be it known that I, PAUL I. MURRILL, a citizen of the United States, residing at New York, county of New York, State of New York, have invented certain new and useful Improvements in Processes of Vulcanizing Rubber, of which the following is a full, clear, and exact description.

This invention relates to a new and useful process of vulcanizing rubber and pertains more particularly to that manner of vulcanizing known as cold curing, and has for its object the subjection of the unvulcanized rubber to the action of a liquid vulcanizing agent which is suitably treated to maintain it in a technically pure condition, thereby preventing any impurities deleterious to rubber from entering the article during vulcanization and making it feasible to repeatedly use the vulcanizing agent until entirely consumed, thus rendering a material saving in the vulcanizing process and producing a superior vulcanized rubber product.

In vulcanization by the cold cure process, sulfur monochlorid is generally used as the vulcanizing agent. The unvulcanized rubber may be subjected to the action of this substance in either a vaporized or liquid state. The affinity of the liquid for the unvulcanized rubber is, however, so great that an inert diluent, as, for instance carbon tetrachlorid, is necessary.

Sulfur monochlorid has a strong affinity for water, and when the moisture in the surrounding air comes in contact with the surface of this liquid, the water and sulfur-monochlorid readily decompose each other, the reaction taking place resulting for the most part in the formation of free sulfur which is inert and remains dissolved or suspended in the liquid; hydrochloric acid which is dissolved in the liquid; and sulfur dioxid which passes off as gas.

In commercial sulfur monochlorid any impurities resulting from decomposition are eliminated by the process of distillation, and when a quantity of such liquid is opened up for the first time after being purified in this way, it is in substantially a chemically pure condition in so far as any substances deleterious to rubber are concerned. This condition, however, is little more than momentary for on coming in contact with the moisture in the surrounding air, decomposition begins in the manner above explained. These impurities present in the liquid are known to be injurious to rubber products and materially shorten their life and usefulness. They are so manifest in the liquid and increase so rapidly on continued exposure to the atmosphere that, although great care is taken in keeping the liquid closed from the air as much as possible while not being used, it can be used but a few times and must then be discarded, and even the products that are vulcanized are of inferior quality. For this reason, vulcanization by the cold cure process is confined to a very limited field of usefulness.

While, as above mentioned, substantially pure sulfur monochlorid has been momentarily obtained by the physical process of distillation, it has never been attempted, as far as I am aware, to maintain the liquid in a continually pure state for use as a vulcanizing agent. By pure sulfur monochlorid I mean the absence therefrom of such substances as have a deleterious action upon the rubber product.

It can be readily appreciated that to provide a chemically pure vulcanizing agent would be of great value and it is the object of this invention to so treat the sulfur monochlorid that this end may be attained. The objectionable reactions taking place in the liquid are continuous on account of the continuous presence of vapor in the surrounding atmosphere, and while I do not attempt to entirely prevent this decomposition, my process aims at offsetting these reactions by so treating the liquid that other reactions will take place whereby the impurities will be replaced by inert substances. The results attained will be by means of a continuous chemical process rather than by a physical process as by the distillation of the liquid, and will be continuous and permanent instead of being only momentary as in the latter case.

It is known that the metals react with hydrochloric acid, forming as a result free hydrogen, and a corresponding salt, also that some of the metals unite with water, forming free hydrogen, and a corresponding hydroxid. These resulting substances, either pass off as gas or if present in the vulcanizing agent are inert in so far as any deleterious action on the rubber products is concerned.

It can thus be seen, if a suitable metal be added to the sulfur monochlorid liquid containing water and the deleterious substances, it will have a continual offsetting action by chemically uniting with the water and the impurities to produce other substances of an inert character. Unfortunately, however, most metals also unite with the sulfur monochlorid to form free sulfur and a corresponding salt, and for this reason such metals would not be suitable as purifying agents for the liquid. There are however, two groups of metals, known as metals of the alkalis and metals of the alkali earths, which may be associated with sulfur monochlorid without any chemical reactions taking place therewith. These metals I propose to use either separately or in combination as the purifying or preserving agent for the sulfur monochlorid. The former group of these metals comprises lithium, sodium, potassium, rubidium and cæsium, and the latter group comprises magnesium, calcium, strontium and barium.

I have obtained excellent results from the use of metallic sodium. In the preparation of the vulcanizing agent, one or more pieces of this metal are placed in the sulfur monochlorid liquid, which must be diluted with any of the usual inert liquids to adapt it for use. After the sodium is added the liquid is permitted to stand before being used, for some twenty hours, more or less, to give the sodium an opportunity of chemically combining with the impurities present at the time of its introduction into the liquid. After this period has elapsed the liquid may be used as the vulcanizing agent, and the sodium will thereafter continually chemically combine with the impurities as already described.

The unvulcanized rubber may be subjected to the action of the vulcanizing liquid in any preferred and well known manner, as for instance, by subjecting the rubber to a bath of the liquid, or by flowing the liquid over the rubber by a brush, spray, or otherwise.

Having described my invention, what I claim and desire to have protected by Letters Patent is:

1. The process of vulcanizing rubber which consists in intimately associating sulfur monochlorid with metallic sodium and thereafter subjecting the rubber to the action of the sulfur monochlorid.

2. The process of vulcanizing rubber which consists in intimately associating sulfur monochlorid with a purifying agent inert as to the sulfur monochlorid and its solvents, and thereafter subjecting the rubber to the action of said sulfur monochlorid.

3. The process of vulcanizing rubber which consists in intimately associating sulfur monochlorid with a metal of the alkali groups and thereafter subjecting the rubber to the action of said sulfur monochlorid.

4. The process of vulcanizing rubber which consists in treating sulfur monochlorid with a chemically acting purifying agent inert as to the sulfur monochlorid and its solvents, and thereafter subjecting the rubber to the action of said sulfur monochlorid.

Signed at New York, county of New York, State of New York, this 3rd day of December, 1914.

PAUL I. MURRILL.

Witnesses:
FRANCIS BOYLE,
FRED C. BATCHELLOR.